United States Patent [19]

Hamada et al.

[11] 4,420,756

[45] Dec. 13, 1983

[54] MULTI-MODE TRACKING ANTENNA FEED SYSTEM

[75] Inventors: Shinobu J. Hamada, Ranch Palos Verdes; Taro Yodokawa, La Palma, both of Calif.

[73] Assignee: TRW Inc., Redondo Beach, Calif.

[21] Appl. No.: 226,328

[22] Filed: Jan. 19, 1981

[51] Int. Cl.[3] .................... G01S 13/44

[52] U.S. Cl. .................... 343/16 M; 333/122; 333/135; 333/137; 343/786

[58] Field of Search .................... 333/117, 122, 125, 126, 333/135, 137, 21 R; 343/16 M, 786

[56] References Cited

U.S. PATENT DOCUMENTS

| | | | |
|---|---|---|---|
| 2,965,898 | 12/1960 | Lewis | 333/122 X |
| 3,274,604 | 9/1966 | Lewis | 343/786 |
| 3,369,197 | 2/1968 | Giger et al. | 333/21 R |
| 3,423,756 | 1/1969 | Foldes | 333/21 R X |
| 3,569,870 | 3/1971 | Foldes | 333/21 R |
| 3,696,434 | 10/1972 | Sciambi, Jr. | 333/21 R X |
| 3,758,880 | 9/1973 | Morz | 333/122 |
| 4,047,128 | 9/1977 | Morz | 333/21 R X |

*Primary Examiner*—Paul L. Gensler

*Attorney, Agent, or Firm*—Robert W. Keller; Donald R. Nyhagen

[57] ABSTRACT a tri-mode coupler (80) for developing from a received signal including three waveguide propagation modes the three tracking signals (i.e. sum signal, elevation signal, and azimuth signal) used in a high-frequency monopulse tracking system and for transmitting a signal at a different frequency, the coupler comprises broadband means such as a two-arm turnstile junction (84) coupling a first circular waveguide section (82) to an E-plane folded hybrid junction (90) for separating out one waveguide mode of the received signal and receiving the signal to be transmitted, and a second circular waveguide section (86) of smaller diameter than the first waveguide section and coupling the latter section to an additional E-plane folded hybrid junction (88) for separating out the two additional waveguide modes of the received signal.

14 Claims, 8 Drawing Figures

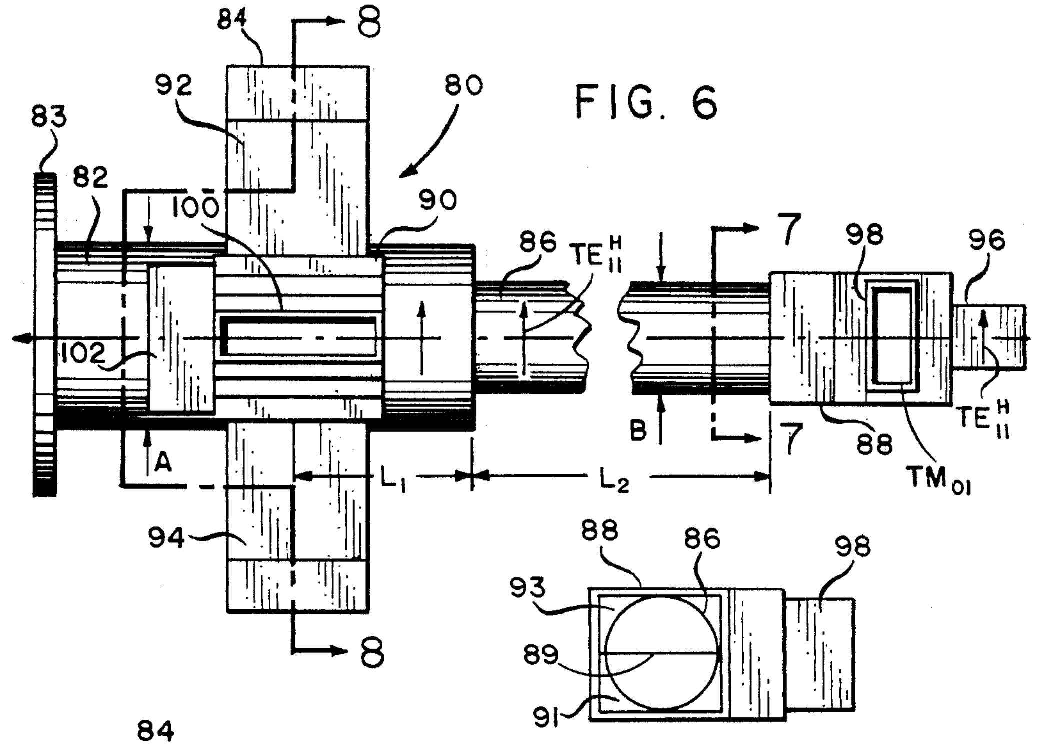
FIG. 6
FIG. 7
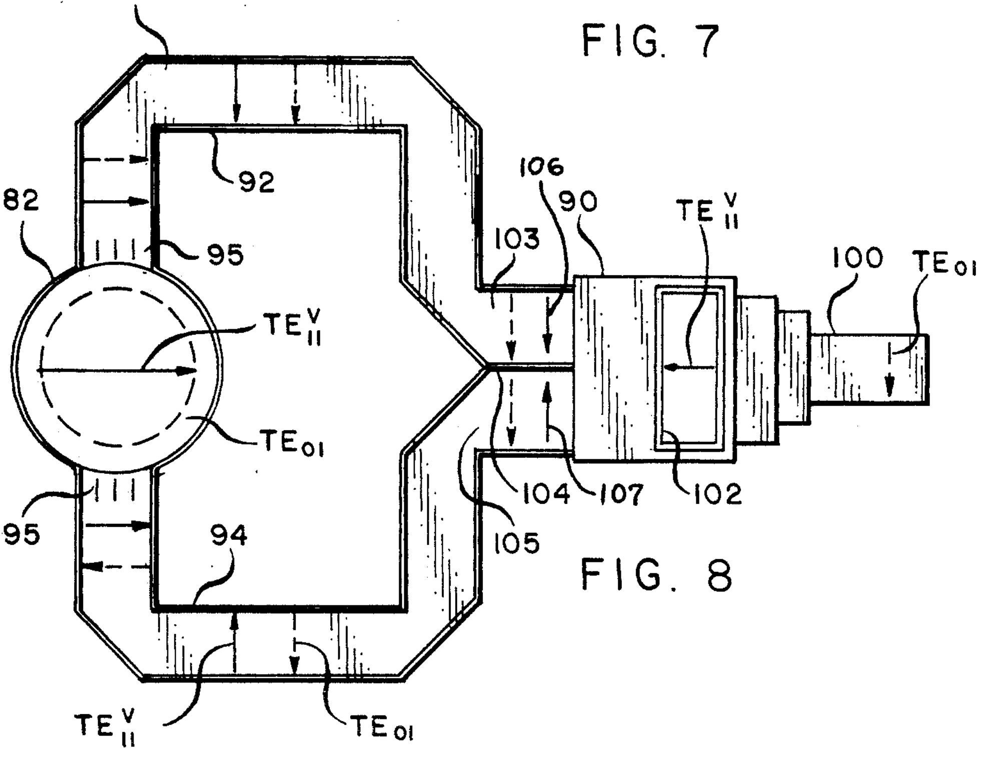
FIG. 8

MULTI-MODE TRACKING ANTENNA FEED SYSTEM

TECHNICAL FIELD

The present invention relates to electromagnetic wave energy transmission systems and more specifically, to a device for coupling an antenna to a two-way communication system which includes a monopulse tracking receiver that is particularly adapted for use in satellite tracking systems.

BACKGROUND ART

It is well known that in order to maintain reliable communications between an orbiting satellite and ground stations, the antenna of the satellite system must be pointed accurately toward the ground station antenna with which the satellite is in communication using a high-gain reflector antenna system. In order to achieve this accurate pointing, satellites commonly employ tracking systems to provide signals indicative of the pointing errors in elevation and azimuth relative to the antenna beam of the ground station antenna. These tracking signals control the satellite's reaction control system to orient the satellite as required to position the antenna accurately towards the ground station antenna despite changes in the relative locations thereof. Typically, there is a corresponding tracking system at the ground station that permits accurate pointing of the ground station antenna as well.

Typically, the tracking system on the satellite utilizes a monopulse-tracking configuration in which a plurality of antennas, feeding a reflector-system, are employed to develop three tracking signals indicative of the pointing accuracy of the satellite antenna. These three tracking signals are the azimuth difference signal, elevation difference signal, and the sum signal. The phase and amplitude characteristics of these three signals are utilized in a conventional manner to generate elevation angle error and azimuth angle error signals to control the pointing direction of the satellite antenna. The specific manner in which the monopulse tracking receiver operates is well-known in the art and need not be described in detail herein. By way of example, the use of monopulse tracking systems for radar applications is treated extensively in the text entitled *Radar Handbook* by M. I. Skolnik, published by the McGraw Hill Book Company in 1970.

One disadvantage of conventional monopulse tracking systems is that such systems are designed to operate with cumbersome antenna arrays. In such arrays, a plurality of antennas are used to develop the sum and difference signals needed to provide the receiver with the means for developing the elevation and azimuth angle error signals for controlling the tracking system. Such cumbersome plural antenna arrays tend to be larger and heavier than desirable for satellite applications. In addition, because the beam of each such antenna is located at discrete point separated from the beam of each of the other antennas in the array, monopulse tracking with such a system tends to introduce inherent tracking errors that reduce the accuracy of the tracking system. Too small a separation distance between feed antennas reduces the antenna system efficiency. Too large a separation distance between feed antennas places the beam cross-over points in the respective sidelobes of the beams rendering the antenna system highly susceptible to instability errors. These problems are exacerbated further in those satellite tracking systems that employ different uplink and downlink frequencies for dual mode tracking and communication.

The present invention comprises a feed system that overcomes the disadvantages of the prior art mentioned above by providing the monopulse sum and difference signals for a monopulse tracking receiver while operating with surprisingly efficient mode coupling in conjunction with only a single antenna. In addition, the present invention makes it possible to efficiently utilize that single antenna for downlink transmission as well.

An additional advantage of the present invention relates to the polarization of the electromagnetic energy transmitted between ground station and satellite. More specifically, in conventional monopulse tracking systems for satellite applications, circular polarization is used for the tracking signal to minimize inadvertent tracking errors that might otherwise occur when such monopulse systems are implemented with multiple antenna arrays. However, at the very high frequencies of of transmission of modern satellite communication tracking systems, such as at frequencies above 15 GHz, studies have shown severe degradation of the propagation of such circularly polarized high frequency signals as a result of heavy rain. Consequently, for certain applications such as highly accurate tracking, the use of circularly polarized signals may not be feasible with consistent reliability. The present invention also circumvents this rain-induced signal degradation problem by using linear polarization to derive the tracking error signals as well as the uplink and downlink sum signals as will be more fully understood hereinafter. The highly efficient use of a single antenna feed system, made possible by the present invention, results in a more efficient transmission link which overcomes the reduction in transmission efficiency that arises in use of linear polarization. STATE OF THE PRIOR ART There are numerous patents which disclose coupling concepts that are relevant to the present invention. By way of example, U.S. Pat. No. 3,731,236 to DiTullio discloses a system coupled to a single antenna horn which includes means for handling two independently polarized signals at one frequency in combination with a second means isolated from the first means by a cut-off which is capable of processing two independent polarized signals at a second frequency.

U.S. Pat. No. 3,369,197 to Giger et al discloses a satellite tracking system incorporating a single antenna feed horn in combination with coupling means capable of isolating several modes of propagation of circular polarization.

U.S. Pat. No. 3,566,309 to Ajioka discloses means for coupling four waveguide modes representing two different frequencies from a horn antenna and a tracking system.

U.S. Pat. No. 3,715,688 to Woodward discloses the concept of utilizing slots which function as grids which assist in creating a $TM_{01}$ mode and linearly polarized $TE_{11}$ mode.

U.S. Pat. No. 2,730,677 to Boissinot et al discloses a concept of extracting energy from a circular waveguide segment by means of two rectangular waveguide segments.

Other multi-mode, single antenna feed systems using relatively inefficient coupling schemes are disclosed in articles appearing at pages 62 et seq of the 1962 NEREM Record and at pages 94 et seq of the 1963

NEREM Record, respectively. These two articles are respectively entitled: *Feed Design For Large Antennas* by Jensen et al, and *A Low-Noise Multimode Cassegrain Monopulse Feed With Polarization Diversity* by Jensen.

However, none of the known prior art discloses a device utilizing the high efficiency coupling scheme of the present invention for using linear polarization to derive the tracking error signals and sum pattern for a monopulse tracking system from one antenna at a single receiving frequency. Furthermore, applicants know of no prior art which, in addition to the above, also provides means for transmitting at a different frequency utilizing still an additional mode of waveguide operation and linear polarization.

SUMMARY OF THE INVENTION

The present invention, hereinafter referred to as a multi-mode or tri-mode coupler, may be described as having two main portions. A first portion consists of a two-arm turnstile junction by means of which the $TE_{01}$ mode, at a high frequency such as 30 GHz, and having azimuth track error signal thereon, is separated from the remaining modes to provide one of the three received signals. In addition, by means of the first portion of the invention, the $TE_{11}^V$ (vertical) mode, at a lower frequency such as 18 GHz, is coupled to the antenna for downlink transmission to the ground station. These two modes are coupled to a pair of rectangular waveguides through a set of polarization grids which discriminate against the $TM_{01}$ and $TE_{11}^H$ (horizontal) modes. It will be seen hereinafter in the detailed description of the present invention, that the efficiency of the coupling of these two modes, namely, the $TE_{01}$ mode and the $TE_{11}^V$ mode, is dependent upon the geometry of the larger and smaller portions of the present invention. A second portion, of smaller diameter circular waveguide section, is designed to propagate only the $TM_{01}$ mode at the higher frequency (e.g. 30 GHz), on which the elevation track angle signal is received, the $TE_{11}^H$ mode upon which the uplink sum signal is received, also at the higher frequency, and the $TE_{11}^V$ mode upon which the downlink signal is transmitted at the lower frequency.

It is therefore a primary object of the present invention to provide a high efficiency multi-mode coupling feed system primarily for use in a monopulse tracking system for satellites in which a sum signal and two angle error tracking signals may be derived from a single receiving antenna for a tracking receiver.

It is another object of the present invention to provide a multi-mode satellite tracking antenna feed system that utilizes linear polarized signals to preclude propagation problems associated with the effects of transmission of circularly polarized high frequency electromagnetic wave energy in heavy rain.

It is still another object of the present invention to provide a multi-mode satellite tracking antenna feed system which provides an improved means for separating three different modes of waveguide transmission at a single frequency for a monopulse tracking receiver, and in addition provides means for coupling an additional mode of waveguide transmission at a different frequency for downlink transmission to a ground station.

BRIEF DESCRIPTION OF THE DRAWINGS

The above-indicated objects and advantages of the present invention, as well as additional objects and advantages thereof, will be better understood as a result of the detailed description of a preferred embodiment of the present invention taken in conjunction with the accompanying drawings in which:

FIG. 6 is a side view of the present invention with a portion cut away for purposes of clarity;

FIG. 7 is a sectional view taken along the lines 7—7 of FIG. 6; and

FIG. 8 is a sectional view taken along the lines 8—8 of FIG. 6.

DETAILED DESCRIPTION OF A PREFERRED EMBODIMENT

Figure 1:
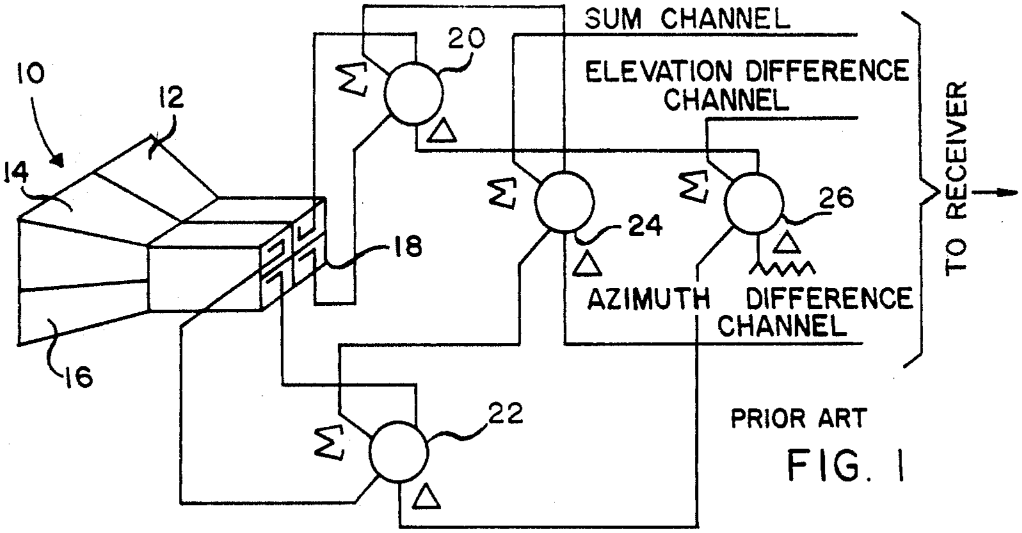
PRIOR ART FIG. 1
FIG. 1 is a block diagram of a prior art antenna and feed system for use in a monopulse tracking system.

Referring now to FIG. 1, there is shown a block diagram representation of a multi-antenna array and feed system for a conventional prior art monopulse tracking system 10. FIG. 1 illustrates the means by which three tracking signals are derived in the conventional system. As shown in FIG. 1, the antenna array comprises four tapered horn antennas 12, 14, 16, and 18, the received signals from which are combined by means of four hybrid junctions 20, 22, 24, and 26 to produce the three tracking signals, namely, the sum channel tracking signal, the elevation difference error signal, and the azimuth difference error signal.

The hybrid junctions 20, 22, 24, and 26 operate in a well-known manner to provide the sum (Σ) and the difference (Δ) at separate output ports, of two input signals available at two input ports. Thus, hybrid junction 20 develops the sum Σ and difference Δ of the two antennas 12 and 18, while hybrid junction 22 produces the sum Σ and difference Δ of the two input signals from antennas 14 and 16. The difference signal Δ from each of hybrid junctions 20 and 22 are input to hybrid junction 26, the sum signal thereof being the elevation difference angle signal input to the tracking receiver. Similarly, the two sum signals Σ of hybrid junctions 20 and 22, are combined in hybrid junction 24 to provide a sum signal Σ which represents the sum channel signal for the entire antenna array. In addition, hybrid junction 24 provides a difference signal Δ which represents the azimuth difference error signal also input to the tracking receiver. It will be recognized by those having skill in the art to which the present invention pertains, that there are many other ways in which the output signals of a multi-antenna array may be combined using hybrids, magic T+s, and the like to provide the three signals input to a tracking receiver. However, in the prior art, a multiple antenna array or multiple aperture array is needed to provide the requisite sum and difference signals illustrated in FIG. 1.

Figure 2:
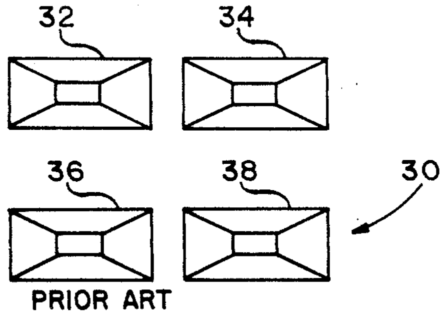
PRIOR ART FIG. 2
FIGS. 2 and 3 are front elevation views of two prior art plural antenna array feeds for use in a monopulse tracking system.
Figure 3:
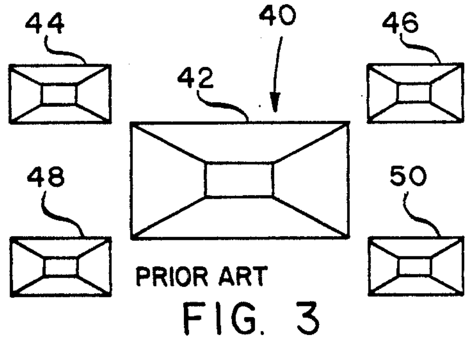
PRIOR ART FIG. 3

Typical examples of such prior art multiple antenna arrays are illustrated in FIGS. 2 and 3, respectively. In FIG. 2, a multiple antenna array 30 comprises four horn antennas 32, 34, 36, and 38, arranged in rectangular configuration to provide an azimuth angle difference signal between either or both antennas 32 and 36 relative to either or both of antennas 34 and 38. Similarly, elevation angle difference signals may be developed from either or both of antennas 32 and 34 relative to either or both of antennas 36 and 38.

Typically, all four antennas provide signals which are summed to provide the sum channel signal illustrated in FIG. 1. As a result of the linear displacement in the plane of the antenna apertures between the discrete beams of the four antennas, tracking errors may be induced, particularly in the sum channel. Accordingly, it is also common in the prior art to provide a five antenna array 40 illustrated in FIG. 3 in which there is a centrally located antenna 42 in addition to the four spaced antennas 44, 46, 48, and 50 which are used to derive the angle error signals in the same manner as that described for FIG. 2. The use of plural antenna arrays is highly disadvantageous from the standpoint of weight and volume for satellite and other spacecraft applications. Furthermore, the circularly polarized energy used in prior art arrays results in propagation degradation in heavy rain as previously described.

The present invention obviates the prior art requirement for multiple antenna arrays and multiple aperture arrays by providing a unique feed system for developing the three signals for a monopulse tracking system. The present invention is designed to operate with only a single antenna which may be any one of a variety of configurations as long as it is able to support three waveguide modes. One suggested antenna for use with the feed system of the present invention is a circular conical horn with circumferential corrugations on the wall thereof.

Figure 4:
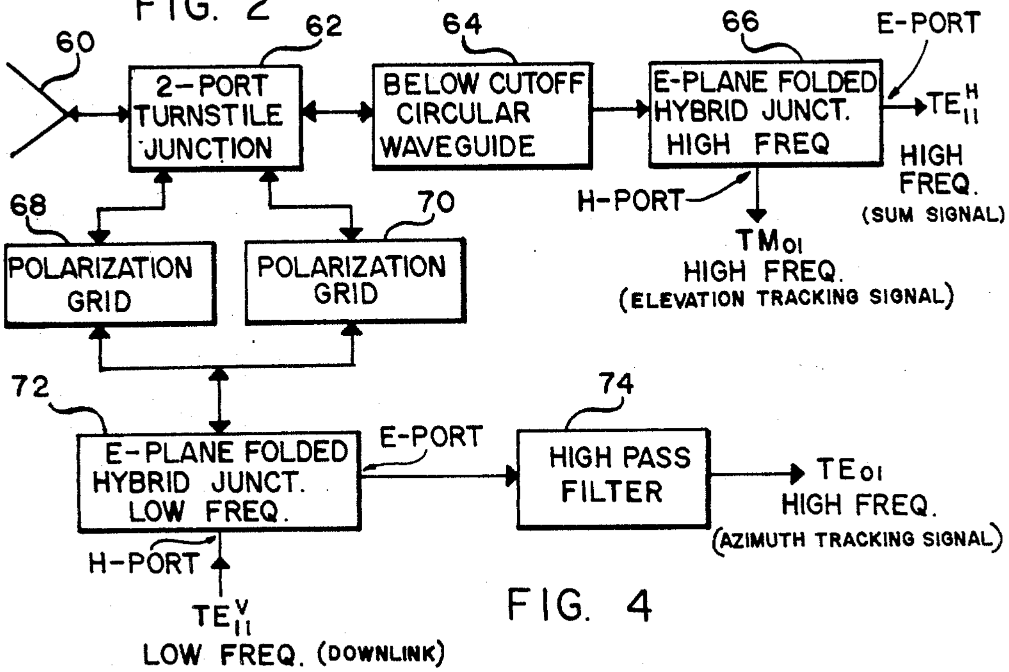
FIG. 4 is a block diagram of the feed system in accordance with the present invention.

A block diagram representation of the multi-mode feed system of the present invention is presented in FIG. 4. A preferred physical embodiment is illustrated in FIGS. 5–8 and discussed in detail below. As illustrated in FIG. 4, the invention is coupled directly to a suitable antenna 60 and comprises a two-port turnstile junction 62, a below cut-off circular waveguide 64, and E-plane folded hybrid junction 66, two polarization grids 68 and 70, and an additional E-plane folded hybrid junction 72. A high pass filter 74 is an optional addition preferably used to isolate downlink transmission at a different frequency. Two-port turnstile junction 62 comprises two rectangular waveguides and one circular waveguide. The circular section, which connects to antenna 60, is, like antenna 60, capable of supporting three waveguide modes at the two different frequencies of operation, such as 18 and 30 GHz. Circular waveguide 64 is a waveguide section of circular cross-section which has a diameter below cut-off for the high frequency $TE_{01}$ mode, but which passes with minimum attenuation the high frequency $TM_{01}$ mode, the high frequency $TE_{11}{}^{H}$ mode, and the low frequency $TE_{11}{}^{V}$ mode.

E-plane folded hybrid junction 66 is a well-known four-port hybrid device which can be used as either a divider or combiner of two signals. Hybrid junction 66 is, in the embodiment illustrated, tuned for optimum performance at the uplink signal band frequency of approximately 30 GHz. The dual ports of the hybrid respond to the $TM_{01}$ mode by exciting only the H-port. Similarly, the hybrid responds to the $TE_{11}{}^{H}$ mode by exciting only the E-port. Thus, the two modes are separated. The $TM_{01}$ mode signal, available at the H-port of the E-plane folded hybrid junction 66, responds to the received signal to provide an elevation tracking signal, while the $TE_{11}{}^{H}$ mode, available at the E-port of E-plane folded hybrid junction 66, responds only to the sum signal, and E-plane folded hybrid 66 reflects the $TE_{11}{}^{V}$ signal.

Polarization grids 68 and 70 may be either metallic bars or strips that are placed across the physical junctions of aperture points of the circular and rectangular waveguides in turnstile junction 62. The grids lie in a plane perpendicular to the direction of propagation and a direction parallel to the top and bottom walls of the rectangular waveguides to suppress any longitudinal components of electric field of the high frequency transverse magnetic modes. Thus, polarization grids 68 and 70 prevent propagation of the $TM_{01}$ mode to E-plane folded hybrid junction 72. Grids 68 and 70 also block the $TE_{11}{}^{H}$ mode.

E-plane folded hybrid junction 72 is a four-port hybrid device. The low frequency transmit or downlink signal is applied to the H-port of junction 72, and as described below in conjunction with FIG. 8, that transmitted signal is divided into component signals of equal amplitude and in such phase relationship that when combined at the circular waveguide, those two components merge as a $TE_{11}{}^{V}$ mode. On the other hand, a circumferential electric vector of the $TE_{01}$ mode, at high frequency, causes only the E-port of hybrid junction 72 to be excited. Although the E-port and H-port of low frequency hybrid 72 are isolated, a high pass filter 74 is preferably connected to the E-port of E-plane folded hybrid junction 72 to assure that only the high frequency received $TE_{01}$ mode signal is permitted to reach the tracking receiver. This $TE_{01}$ high frequency received signal represents the azimuth tracking signal received at antenna 60.

Thus, as illustrated in block diagram form in FIG. 4, the feed system of the present invention provides a uniquely efficient means for signal mode separation which permits the use of only a single antenna for developing three tracking error signals for a monopulse tracking receiver, and also for developing a downlink transmission signal at a different frequency. Further description of the manner in which the feed system of the present invention operates will now be provided in conjunction with physical representations of one embodiment of the feed system, shown in FIGS. 5 through 8.

Figure 5:
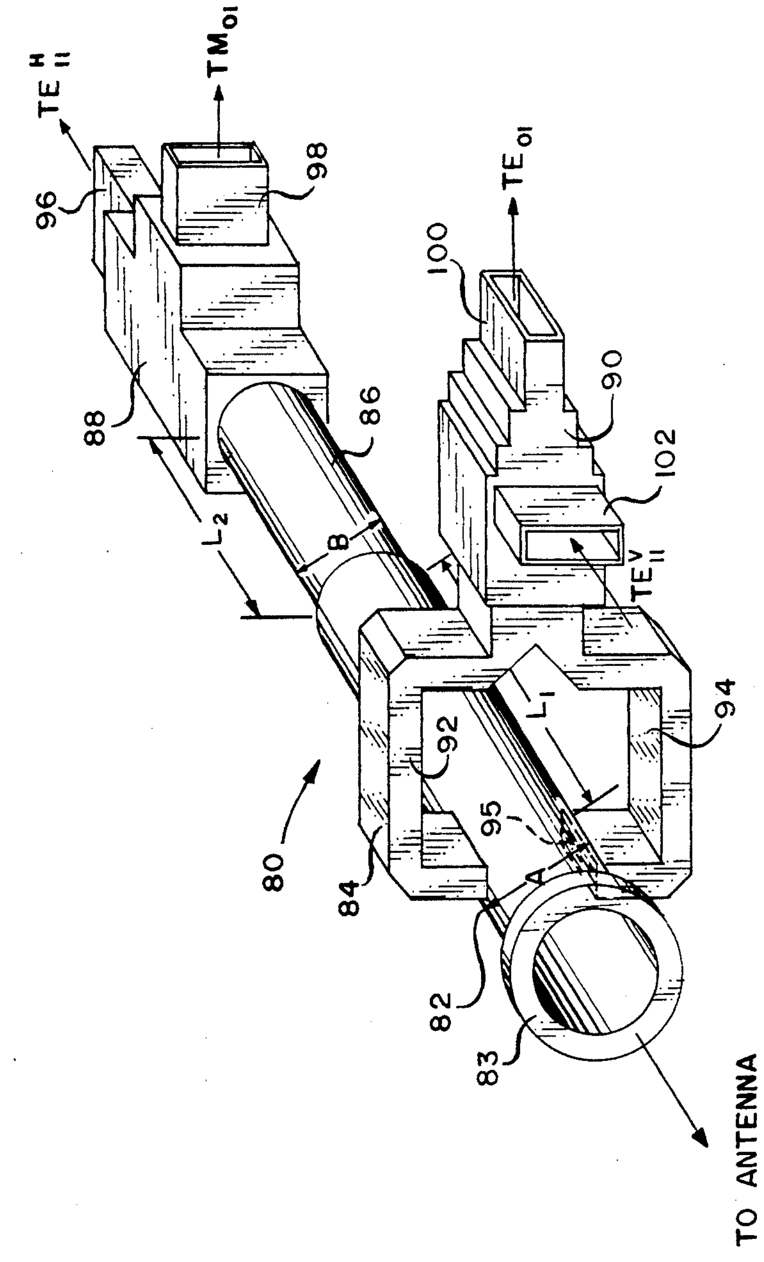
FIG. 5 is a perspective view of a preferred embodiment of the present invention.

As shown in FIG. 5, which is a perspective view of the tri-mode coupler feed system shown in block diagram form in FIG. 4, coupler 80 comprises a circular waveguide section 82 of diameter A, and a suitable flange 83 for mating with antenna 60 as previously discussed. Located along circular waveguide section 82, intermediate of the ends thereof, is a two-port turnstile junction 84 which will be described in more detail below. The distance between the center of the turnstile junction and the far end of waveguide section 82, as seen in FIG. 5, is designated $L_1$.

The end of circular waveguide section 82 farthest from flange 83, is formed integrally with an additional circular waveguide section 86 of diameter B and length $L_2$. This circular waveguide section of diameter B corresponds to below cut-off circular waveguide block 64, discussed previously in conjunction with FIG. 4 and shall be referred to hereinafter as cut-off waveguide section 86. The far end of cut-off waveguide section 86, as seen in FIG. 5, is connected to an E-plane folded hybrid junction 88 which is tuned for optimum performance at the receive signal band frequency of approximately 30 GHz in the embodiment disclosed. A second E-plane folded hybrid junction 90 is connected to the turnstile junction 84 at a point where rectangular waveguide members 92 and 94 of the turnstile junction merge to form dual ports 103 and 105, separated symmetrically by wall 104 (see FIG. 8). Rectangular waveguide sections 92 and 94 also mate with circular waveguide section 82 at their other ends, respectively, in matching, rectangularly shaped, diametrically opposed apertures in waveguide section 82, each of which apertures includes polarization grids 95 (shown in dashed lines in FIG. 5). As previously indicated, polarization grids 95 are included to suppress longitudinal components of electric field of the high frequency transverse magnetic mode which is thus allowed to propagate only along the longitudinal axis of waveguide section 82 toward folded hybrid junction 88.

Folded hybrid junction 88 provides an E-port 96 and an H-port 98. Similarly, folded hybrid junction 90 provides an E-port 100 and an H-port 102. Because of the unique mode separation capability of the present invention, which will be described in more detail hereinafter, E-port 96 of hybrid 88 provides an output signal in the $TE_{11}^{H}$ mode which signal corresponds to the uplink sum channel at the high frequency of, for example, 30 GHz. Similarly, H-port 98 of hydrid 88 provides a $TM_{01}$ mode signal corresponding to the elevation angle channel of the high frequency signal. On the other hand, E-port 100 of hybrid 90 provides a $TE_{01}$ mode signal corresponding to the azimuth angle channel of the uplink high frequency signal. H-port 102 of hybrid 90 is suitable for inputting a signal for downlink transmission at a lower frequency such as 18 GHz. By way of example, a $TE_{11}^{V}$ mode signal corresponding to the downlink sum channel may be used by the ground station for communications or tracking. As shown further in FIG. 5, the signal available at E-port 100 of hybrid 90 is preferably connected to a suitable high-pass filter to ensure frequency separation between the uplink azimuth channel error signal and the downlink signal.

The manner in which the tri-mode coupler of the present invention as illustrated in the embodiment of FIG. 5 provides separation of the three uplink modes, as well as a downlink mode at a lower frequency, will now be more fully described in conjunction with FIGS. 6 through 8.

In the description of the tri-mode coupler of the present invention in conjunction with FIGS. 6 through 8, those having skill in the art to which the present invention pertains will appreciate that the description of the mode separation characteristics of the invention is based upon conventional well-known descriptions of circular and rectangular waveguide transmission modes such as those described in Tables 8.02 and 8.04 in the text entitled "Fields and Waves in Communication Electronics" by Ramo, Whinnery, and Van Duzer, published by John Wiley and Sons in 1965. In addition, it will be recognized that the cut-off frequency characteristics of the circular waveguide section 86 are based upon well-known frequency cut-off behavior for waves in a circular guide as exemplified by FIG. 8.04a at page 431 of the above-indicated text.

With these well-known waveguide characteristics in mind, it will be observed that the high frequency $TE_{11}^{H}$ mode will readily propagate through the larger circular waveguide section 82 and through the smaller diameter circular waveguide section 86 to E-plane folded hybrid junction 88 where it will be available at E-port 96 thereof. Similarly, the $TM_{01}$ mode, also at the higher frequency, readily propagates along the same path. Because it has a cut-off frequency only slightly higher than the $TE_{11}^{H}$ mode, the $TM_{01}$ mode signal also propagates through the smaller circular waveguide section 86 to hybrid 88 where it, in effect, sets up two out-of-phase components of a $TE_{01}$ rectangular waveguide mode at the dual ports 91 and 93 of the hybrid. Dual ports 91 and 93 are shown in cross-section in FIG. 7. These two dual ports of the hybrid, are separated by symmetrically located wall 89 disposed in a plane that is parallel to the side walls of port 98 in a well-known fashion. As a result, the energy propagated in a $TM_{01}$ mode emerges from the H-port 98 of hybrid 88. Wall 89 provides a short circuit for $TE_{11}^{V}$ mode at the downlink frequency.

The method by which the $TE_{11}^{V}$ low frequency signal, for downlink transmission, and the $TE_{01}$ mode receive signal are separated by the present invention is seen best in FIG. 8. In FIG. 8 a dashed arrow represents the electric field of the $TE_{01}$ mode signal and a solid arrow represents the electric field of a $TE_{11}^{V}$ mode low frequency signal. As shown, the $TE_{11}^{V}$ low frequency mode signal applied to the H-port 102 of hybrid 90 is resolved into two out-of-phase components 106 and 107 in respective ports 103 and 105 of the hybrid separated by horizontal wall 104. These two out-of-phase components, represented by the solid arrowhead lines, propagate along respective rectangular waveguide sections 92 and 94 to add in phase in the large diameter circular waveguide section 82. The low frequency signal is then coupled to antenna 60.

The received azimuth tracking signal, which is fed to the circular waveguide section 82 in a $TE_{01}$ mode at the higher frequency such as 30 GHz, sets up a circular electric field in waveguide section 82 as shown graphically in FIG. 8. This $TE_{01}$ mode energy propagates into both sections 92 and 94 of the turnstile junction 84 to produce two out-of-phase components as represented by the dashed arrows. However, when these two components reach dual ports 103 and 105, they are in phase and combine to produce a $TE_{01}$ mode output signal at E-port 100 of hybrid 90.

The efficiency of the coupling of the $TE_{01}$ and $TE_{11}^{V}$ modes is dependent to a large extend on the dimensions of the circular waveguide sections of the present invention, namely, lengths $L_1$ and $L_2$ and diameters A and B. Diameter A must be large enough to permit waveguide section 82 to propagate all three modes. Length $L_1$, measured from the mid-point of turnstile junction 84 to the junction of waveguide sections 82 and 86, must be a multiple of one-half waveguide length $\lambda_g$ of section 82 for the high frequency $TE_{01}$ mode signal. The length $L_2$ of the cut-off waveguide section 86 is determined by establishing the length $L_1+L_2$ to be an odd multiple of 90° for the $TE_{11}^{V}$ mode low frequency signal, and then subtracting the length $L_1$ from the sum. In this manner, the length $L_1$ provides for optimum coupling of the $TE_{01}$ signal from the circular waveguide sections 82 and 86 to the rectangular waveguide sections 92 and 94 of turnstile junction 84. Lengths $L_1$ and $L_2$ also provide for in-phase coupling of the $TE_{11}^{V}$ signal energy reflected by E-plane folded hybrid junction 88, as will be more fully discussed hereinafter, and the $TE_{11}^{V}$ signal energy coupled directly from E-plane folded hybrid junction 90 to antenna 60. Thus, $L_1$ must be chosen to be a multiple of one-half wavelength of the $TE_{01}$ mode with diameter A of waveguide section 82 at the frequency used for the uplink transmission. As a result, the $TE_{01}$ mode signal energy reflected by the high voltage standing wave ratio produced by the cut-off waveguide section 86, adds in phase to the directly coupled $TE_{01}$ mode energy from the antenna to produce efficient signal energy transfer to hybrid 90. Similarly, dimension B, that is, the diameter of the cut-off waveguide section 86, must be chosen to provide a cut-off frequency which falls above the cut-off frequencies of the $TM_{01}$ mode and the $TE_{11}{}^{H}$ mode signals of the uplink frequency and the $TE_{11}{}^{V}$ mode signal of the downlink frequency, but below the cut-off frequency of the $TE_{01}$ mode high frequency signal. The polarization grids 95 as seen in FIG. 8, suppress the longitudinal components of electric field of the high frequency signals, and as a result, the $TM_{01}$ mode as well as the $TE_{11}{}^{H}$ mode of polarization perpendicular to the downlink transmit signal, cannot propagate into the rectangular waveguide sections 92 and 94 of turnstile junction 84.

As a result of the above description of a preferred embodiment of the invention it will now be understood that the multi-mode coupler of the present invention provides a highly efficient means of separating three incoming linearly polarized signals of different circular waveguide modes, all at the same frequency, to provide requisite error tracking signals for a monopulse tracking receiver despite operation with only a single antenna capable of supporting such modes. In addition, it will be observed that the present invention affords a means for generating, in the very same feed system and antenna, an additional downlink signal at a separate frequency.

INDUSTRIAL APPLICABILITY

It will now be apparent that what has been disclosed herein is an efficient multi-mode feed system of unique configuration. The invention is particularly adapted for use in a monopulse tracking system and especially advantageous for use in satellite tracking systems. As a result of the novel features of the present invention it is now possible to implement a highly efficient, linearly polarized signal, monopulse tracking system utilizing a single antenna that is capable of supporting three waveguide modes. These modes correspond to the sum signal, the elevation angle signal, and the azimuth angle signal of a monopulse tracking receiver.

It will now also be apparent that because of the unique, coupling structure of the multi-mode system, operation with only a single antenna is now more advantageous. Furthermore, the problems in conventional monopulse tracking systems that use multi-antenna arrays or multi-aperture arrays, which are related to tracking accuracy degradation due to the separation of the respective beams of such antennas, are obviated in the present invention. As a result of the improvement in tracking efficiency made possible by the present invention when used in conjunction with a single antenna, it is now possible to use a signal having a frequency greater than 15 GHz and linear polarization which is not subject to severe degradation during heavy rain.

Although a specific embodiment of the invention has been disclosed herein, it will now be apparent to those having ordinary skill in the art to which the present invention pertains, that other embodiments of the invention may be constructed. For example, in view of applicants' teaching herein disclosed, it will now be apparent that there may be variations in the frequencies of the signals, the geometry, and the type of waveguide devices comprising the invention, while still preserving the high efficiency multi-mode performance thereof. Accordingly, the invention is not deemed to be limited, except as defined by the appended claims.

We claim:

1. An apparatus for coupling linearly polarized electromagnetic wave energy including at least a first, a second, and a third waveguide mode of propagation, each having a predetermined frequency, to at least three channels; the apparatus comprising:

broadband means for coupling a first linearly polarized signal of said first waveguide mode to a first channel including a first portion comprising a first circular waveguide section characterized by a cut-off frequency less than said predetermined frequency for said first, second, and third waveguide modes and a second portion comprising a second circular waveguide section coaxially coupled to said first circular waveguide section and having a cutoff frequency less than said predetermined frequency for said first and second waveguide modes but greater than said predetermined frequency for said third waveguide mode, broadband means for coupling a second linearly polarized signal of said second waveguide mode to a second channel, broadband means for coupling a third linearly polarized signal of said third waveguide mode to a third channel, said means for coupling said second linearly polarized signal comprising a first E-plane folded hybrid junction coupled to said second circular waveguide section and having an E-port for propagating said second waveguide mode, said means for coupling said third waveguide mode signal comprising a second E-plane folded hybrid junction having an E-port for propagating said third waveguide mode, a two-port turnstile junction coupled at a first end to diametrically opposed aperture points on said first circular waveguide section and coupled at a second end to said second E-plane folded hybrid junction, and means for coupling a signal at a predetermined frequency, different from said predetermined frequency for said first, second, and third waveguide modes, from a fourth channel in a waveguide mode equal to one of said first, second and third waveguide modes, for propagation of a linearly polarized signal.

2. The apparatus recited in claim 1 wherein said means for coupling said fourth channel signal comprises an H-port of said second E-plane folded hybrid junction for propagating said fourth channel signal.

3. The apparatus recited in claim 1 wherein said cut-off frequency of said second circular waveguide section is greater than the frequency of said fourth channel signal.

4. The apparatus recited in claim 2 wherein said E-port of said second E-plane folded hybrid junction is coupled to a high pass filter having a cutoff frequency between said fourth channel signal frequency and said predetermined frequency of said first, second and third waveguide modes for isolating said fourth channel signal frequency.

5. The apparatus recited in claims 1, or 2 wherein said first, second, and third waveguide modes are the $TM_{01}$, $TE_{11}{}^{H}$, and $TE_{01}$ circular waveguide, respectively, and wherein said fourth channel signal frequency signal is in a $TE_{11}{}^{V}$ waveguide mode.

6. The apparatus recited in claim 5 wherein the length of said first circular waveguide section between the mid-point of said aperture points and said second circular waveguide section is a multiple of a 180° phase shift for the $TE_{01}$ mode signal.

7. The apparatus recited in claim 5 wherein the sum of the length of said first circular waveguide section between the mid-point of said aperture points and said second circular waveguide section and the length of said second circular waveguide section is an odd multiple of 90° phase shift for the $TE_{11}^{V}$ mode signal.

8. The apparatus recited in claim 1, 2, 3, or 4 further comprising polarization grids at said aperture points for suppressing the longitudinal components of electric field in said turnstile junction.

9. An apparatus for coupling linearly polarized electromagnetic wave energy at a selected receiving frequency from a single antenna capable of supporting first, second, and third waveguide modes of propagation to a receiver having at least three receiving channels, the apparatus comprising:

a first circular waveguide section with a cutoff frequency less than said selected receiving frequency for said first, second, and third waveguide modes and having diametrically opposed apertures, and a second circular waveguide section coaxial with said first circular waveguide section and having a cutoff frequency less than said selected receiving frequency for said first and second waveguide modes but greater than said selected receiving frequency for said third waveguide mode, a first E-plane folded hybrid junction coupled to said second waveguide section and having an H-port for propagating said first waveguide mode, and having an E-port for propagating said second waveguide mode, and a two-port turnstile junction having a first end coupled to said diametrically opposed aperture points on said first circular waveguide section, and having a second end coupled to a second E-plane folded hybrid junction having an E-port for propagating said third waveguide mode.

10. The apparatus recited in claim 9 further comprising an H-port of said second E-plane folded hybrid junction for coupling a signal at a selected transmitting frequency, different from said receiving frequency, from a transmitter to said antenna in a waveguide mode equal to one of said first, second, and third waveguide modes, for transmission as a linearly polarized signal.

11. The apparatus recited in claim 9 wherein said three receiving channels comprise the elevation tracking channel, sum channel, and azimuth tracking channel, respectively, of a monopulse tracking receiver.

12. The apparatus recited in claim 9 wherein said first, second, and third waveguide modes are the $TM_{01}$, $TE_{11}^{H}$, and $TE_{01}$ circular waveguide modes, respectively.

13. The apparatus recited in claim 9, 10, 11, or 12 further comprising polarization grids at said aperture points for suppressing the longitudinal components of electric field in said turnstile junction.

14. A monopulse tracking system comprising:

a single antenna, a multichannel receiver and a multimode feed apparatus for coupling linearly polarized tracking signals of equal frequency from the single antenna, capable of supporting first, second, and third waveguide modes of propagation, to the multichannel receiver for accurately positioning the antenna relative to a distant transmitter; the feed apparatus comprising:

a first circular waveguide section with a cutoff frequency less than said selected receiving frequency for said first, second, and third waveguide modes and having diametrically opposed apertures, and a second circular waveguide section coaxial with said first circular waveguide section and having a cutoff frequency less than said selected receiving frequency for said first and second waveguide modes but greater than said selected receiving frequency for said third waveguide mode, a first E-plane folded hybrid junction coupled to said second waveguide section and having an H-port for propagating said first waveguide mode, and having an E-port for propagating said second waveguide mode, and a two-port turnstile junction having a first end coupled to said diametrically opposed aperture points on said first circular waveguide section, and having a second end coupled to a second E-plane folded hybrid junction having and E-port for propagating said third waveguide mode.

* * * * *

UNITED STATES PATENT AND TRADEMARK OFFICE

CERTIFICATE OF CORRECTION

PATENT NO. : 4,420,756

DATED : December 13, 1983

INVENTOR(S) : Shinobu J. Hamada and Taro Yodokawa

It is certified that error appears in the above-identified patent and that said Letters Patent is hereby corrected as shown below:

Delete "$TE_{11}{}^{V}$" and "$TE_{11}{}^{H}$" throughout the specification and claims and insert --$TE_{11}^{V}$-- and --$TE_{11}^{H}$--.

Column 2, line 38, "STATE OF THE PRIOR ART" should be the heading for the next paragraph.

Column 4, line 56, delete "T+S" and insert --T'S--.

Signed and Sealed this

*Twenty-second* Day of *October 1985*

[SEAL]

*Attest:*

DONALD J. QUIGG

*Attesting Officer*

*Commissioner of Patents and Trademarks—Designate*